US006535109B1

United States Patent
Mahdavi

(10) Patent No.: US 6,535,109 B1
(45) Date of Patent: Mar. 18, 2003

(54) SYSTEM AND METHOD FOR COMMUNICATING WITH MULTIPLE TRANSPONDERS

(75) Inventor: Pourang Mahdavi, Mt. View, CA (US)

(73) Assignee: Texas Instruments Sensors and Controls, Inc., San Jose, CA (US)

( * ) Notice: Subject to any disclaimer, the term of this patent is extended or adjusted under 35 U.S.C. 154(b) by 0 days.

(21) Appl. No.: 09/203,154

(22) Filed: Dec. 1, 1998

(51) Int. Cl.⁷ .................................................. H04Q 5/22
(52) U.S. Cl. ..................... 340/10.3; 340/10.2; 340/10.4; 340/10.5
(58) Field of Search ............................ 340/10.3, 2, 1, 340/10.33, 34, 10.32, 33, 10.34, 35, 572; 370/445; 342/43

(56) References Cited

U.S. PATENT DOCUMENTS 4,180,815 A * 12/1979 Hill .............................. 342/43
5,530,702 A * 6/1996 Palmer et al. ............... 370/445
5,539,394 A * 7/1996 Cato et al. ................ 340/10.32

* cited by examiner

Primary Examiner—Michael Horabik
Assistant Examiner—William Bangachon
(74) Attorney, Agent, or Firm—Sawyer Law Group LLP

(57) ABSTRACT

The object of the invention is a system and method for identifying and communicating with a plurality of transponders which are at the same time in the same interrogation field. The system is based on an interrogator which sends interrogation bursts in a periodical manner, and transponders which send the response back with a random delay related to the end-of-burst event. The system is primarily suitable for passive (no additional power supply) transponders, but can also be used for active transponders.

9 Claims, 6 Drawing Sheets

RD: Random Delay
EOB: End Of Burst
RTS: Request To Send
CTS: Clear To Send

SYSTEM AND METHOD FOR COMMUNICATING WITH MULTIPLE TRANSPONDERS

FIELD OF THE INVENTION

The present invention relates to transponder systems and more particularly to systems that contain several transponders closed to each other.

BACKGROUND OF THE INVENTION

Transponder arrangements are used to identify and interrogate data in a contactless manner. Transponder systems typically include an interrogator that transmits radio frequency pulses and a plurality of transponders that receive the pulses and respond with data in the form of a modulated radio frequency carrier. However, a problem arises when multiple transponders units are present within the field of an interrogation unit and responding simultaneously as shown in FIG. 1. In this case either none or only the transponder with the strongest field strength is detected. Accordingly, what is needed is a system and method for detecting the signal of multiple transponders. The present invention addresses such a need.

SUMMARY OF THE INVENTION

The system and method in accordance with the present invention solves the problem of several transponders in the same reading field with a minimum of effort on the transponder side. This is important because in most of applications the transponder is the cost critical item. The arbitration among the transponders is solved by the fact that the reader unit sends a burst interrogation signal instead of a continuous field. The end of burst signal is detected by each transponder, and is used to launch a random delay generator. At the end of the delay, the transponder with the shortest delay sends a short signal to the reader that is interpreted as a Request To Send signal from the transponder. The reader responds with another burst that causes this transponder to send the main data and the other transponders to stop the transmission. After the first transponder has finished the data transmission, it goes to the sleep mode. The whole process is repeated until there are no more transponders left in the field. If the random delay generated in two or more transponders is the same, they start the transmission of the Request To Send signal at the same time. This collision is detected at the reader, which ignores this signal and repeats the process.

DETAILED DESCRIPTION

The present invention relates to transponder systems and more particularly to systems that contain several transponders close to each other. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest possible scope consistent with the principles and features described herein.

Figure 1:
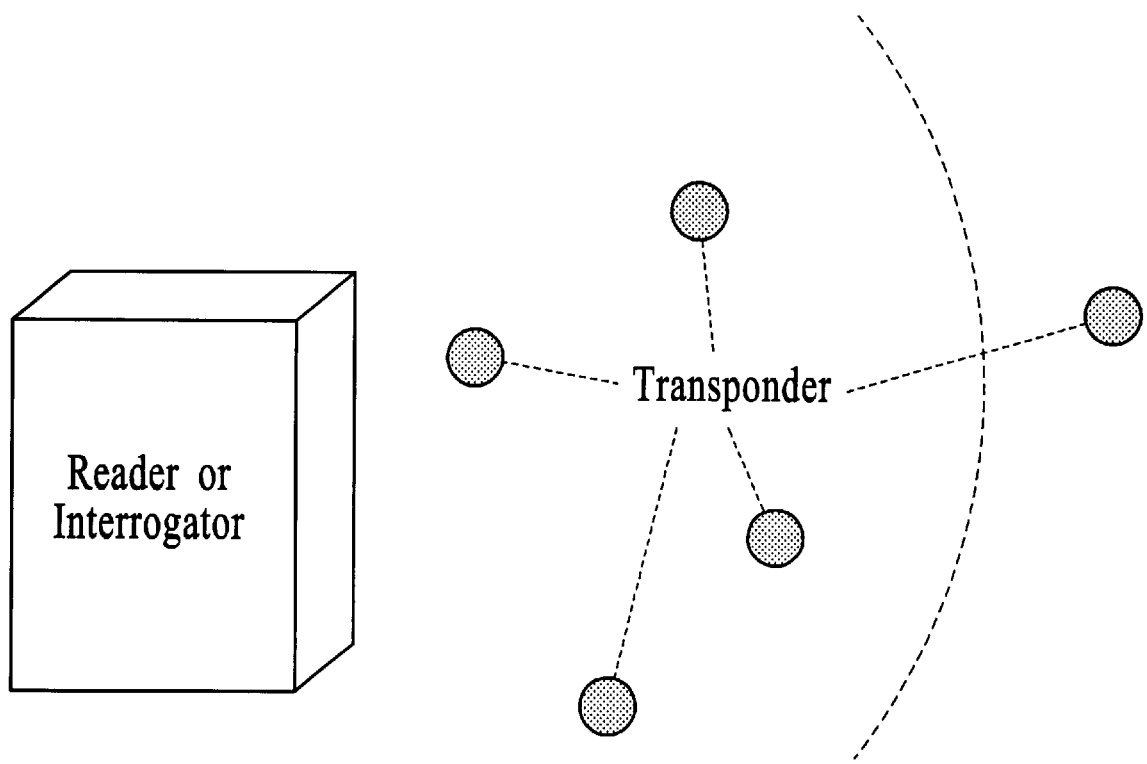
FIG. 1 illustrates multiple transponders in the same interrogation field.
Figure 2:
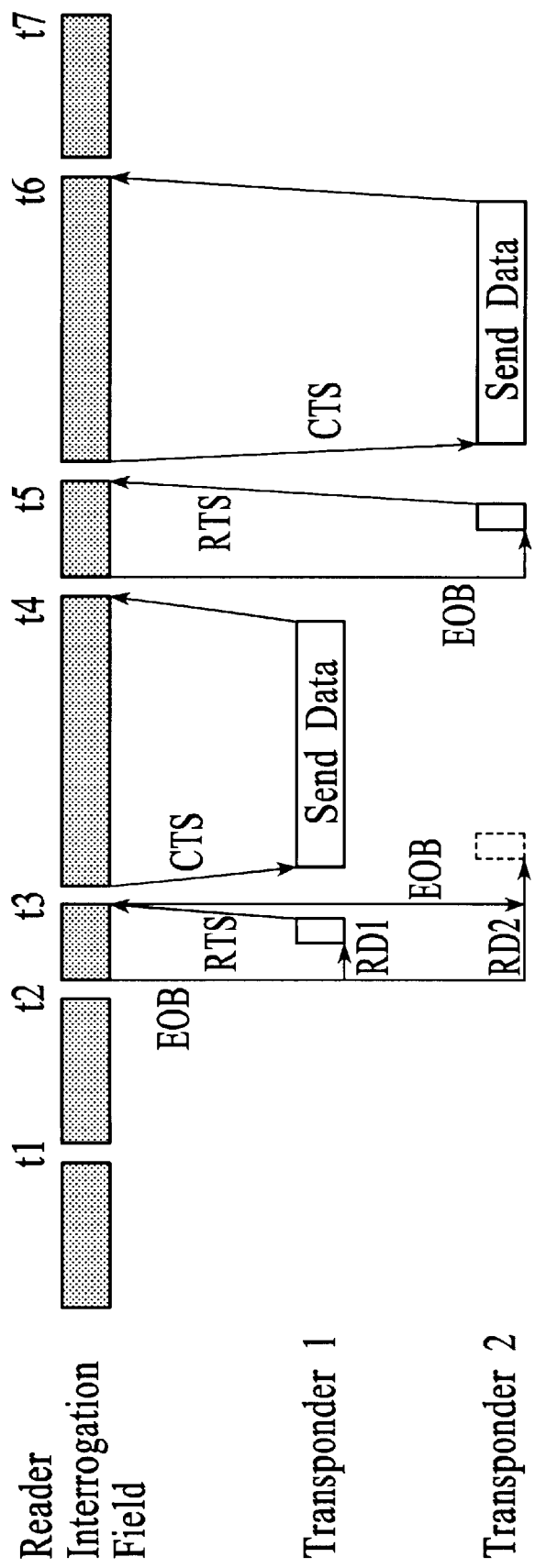
FIG. 2 illustrates the principle of the multi-transponder protocol with the interrogation bursts of the reader and the example of two transponders in the reader field.

The principal method of interrogation of several transponders in the same reader field is shown in FIG. 2 for the simplified case of only 2 transponders. The reader transmits field burst in a periodical manner. Assuming the transponders enter the reader field at time t1, the End Of Burst signal (EOB) is detected in the transponders at time t2 and is used to trigger a Random Delay (RD) generator, which causes a delay RD1 for the transponder 1 and delay RD2 for the transponder 2. After the delay, the transponder sends a Request To Send (RTS) signal back to the reader, which consists of a defined pattern plus a random value. Assuming RD2>RD1, the transponder 1 will send the RTS signal first. As the RTS signal is detected in the reader at time t3, it forces immediately another field gap in the current field burst. The beginning of the next burst is interpreted in the transponder 1 as a Clear To Send (CTS) signal, which causes the transponder 1 to respond with the main data. However, the CTS signal is interpreted in the transponder 2 as a stop signal, which causes the transponder 2 to not to transmit the RTS signal, which the transponder would otherwise send at time RD2. The transponder 1 accomplishes now the transmission of the main data, until receiving another End Of Burst signal from the reader at time t4. After t4, transponder 1 goes into a sleep mode, and only the transponder 2 will be active in the field. Hence after another arbitration phase (t4–t5) the data from the transponder 2 is transmitted to the reader.

Figure 3:
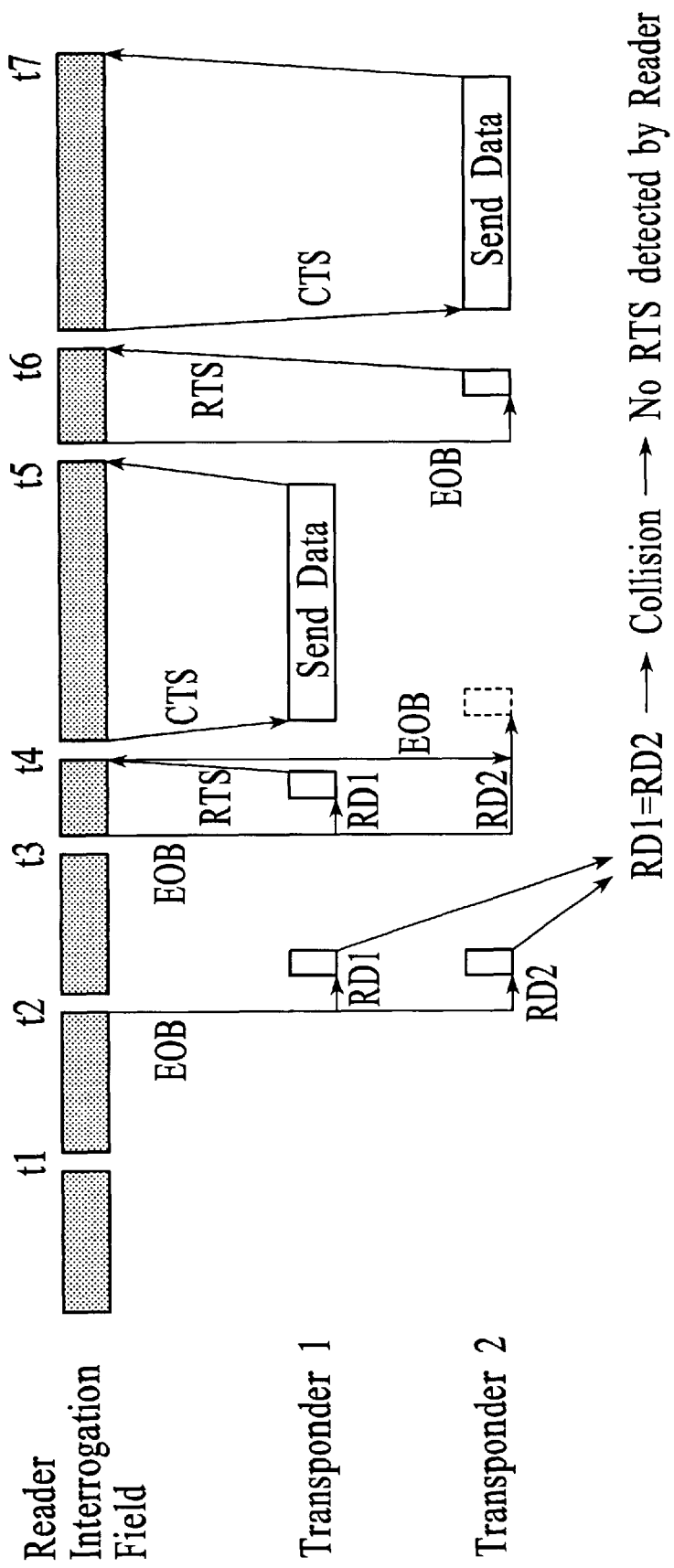
FIG. 3 illustrates the principle of the multi-transponder protocol, collision case.

FIG. 3 shows the collision case, when the random delay generators of the transponders generate the same delay (RD1=RD2) after the EOB signal at t2. In this case the reader because of the collision of the signals can detect no valid RTS signal. The collision detection at the reader is ensured because there is a random pattern encoded in the RTS signal. Since no valid RTS signal is detected, the reader continues the periodic field burst transmission until the random delays generated in the transponders are different, i.e. at t3. At this time the protocol follows the same way as in FIG. 2 until both transponders are detected.

The described method is primarily suitable for passive transponders, which take their required energy from the interrogation field. In this case, the gap for generating the End Of Burst signal must be so short that the transponder can be supplied by a storage capacitor on the transponder. However, the described protocol can also be used for active transponders, which contain an active power source.

Figure 4:
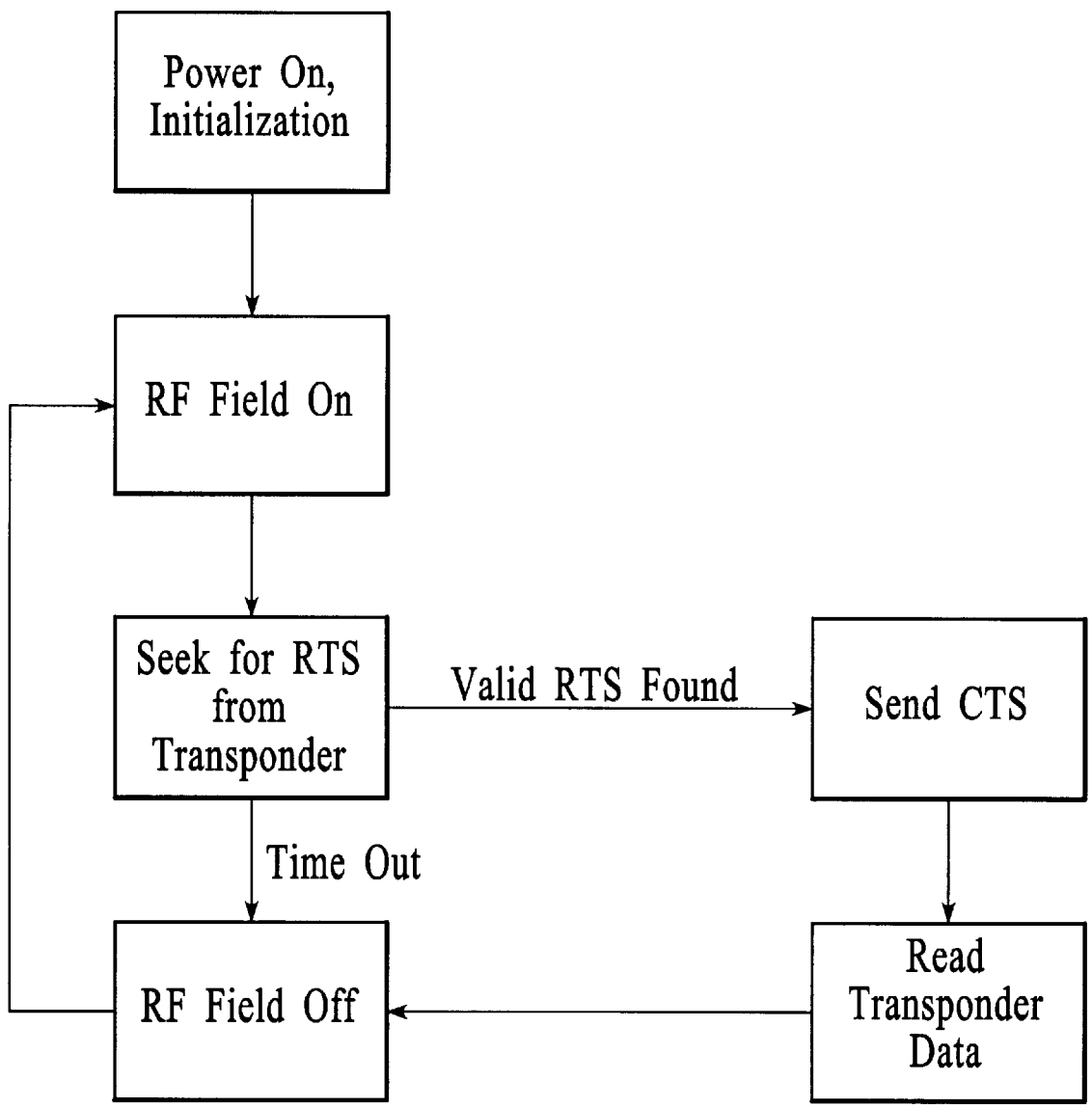
FIG. 4 illustrates state-diagram for the multi-transponder protocol, reader side.
Figure 5:
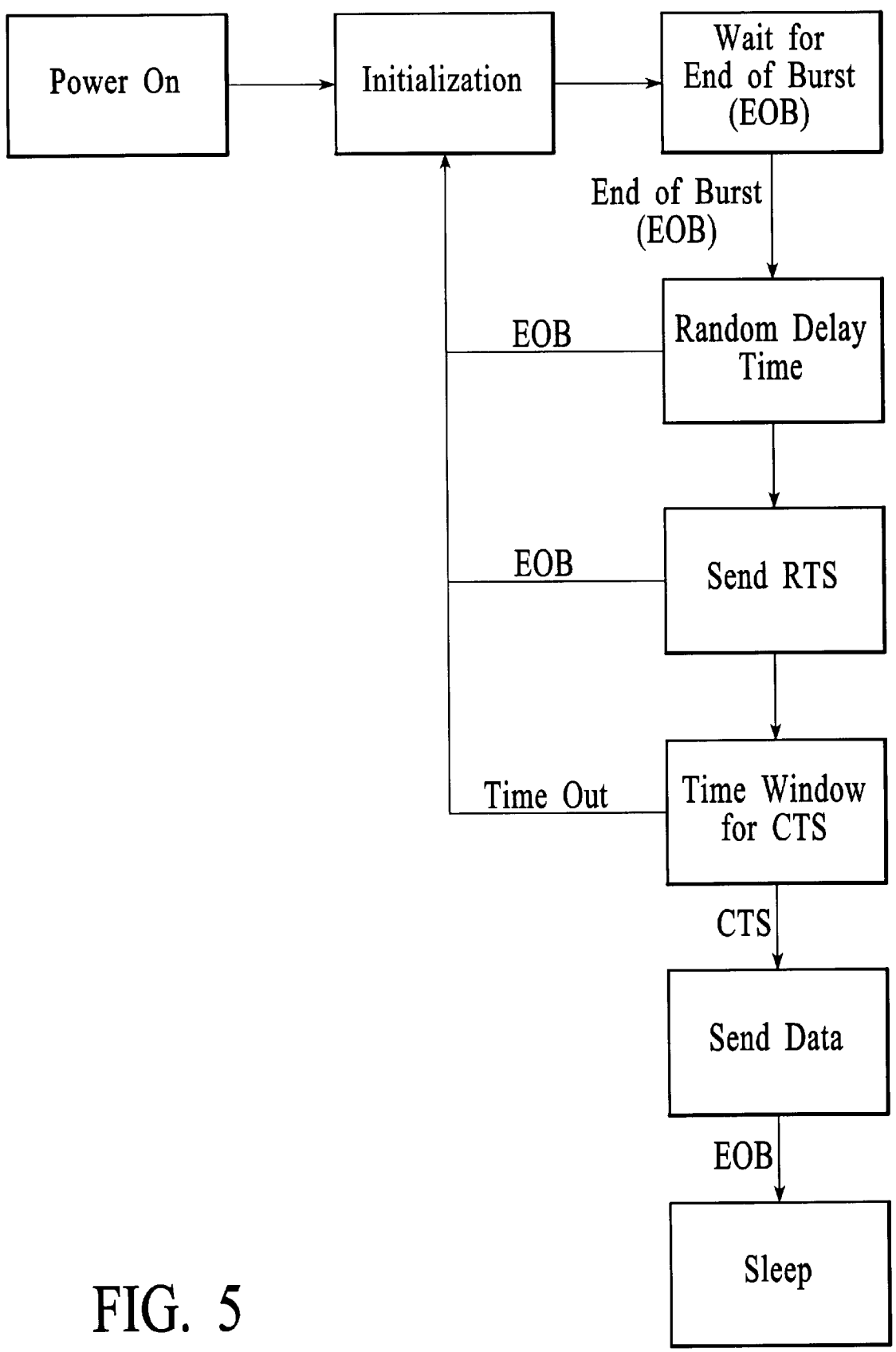
FIG. 5 illustrates state-diagram for the multi-transponder protocol, transponder side.
Figure 6:
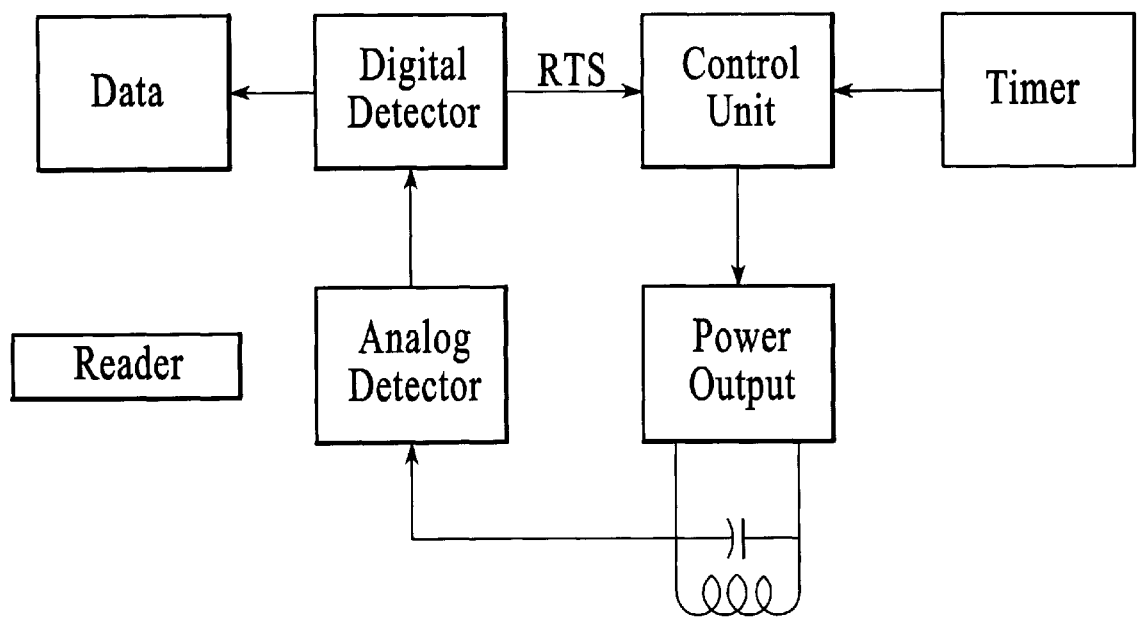
FIG. 6 illustrates the block diagram of the hardware of the reader and the transponder required for the multi-transponder protocol.
Figure 6:
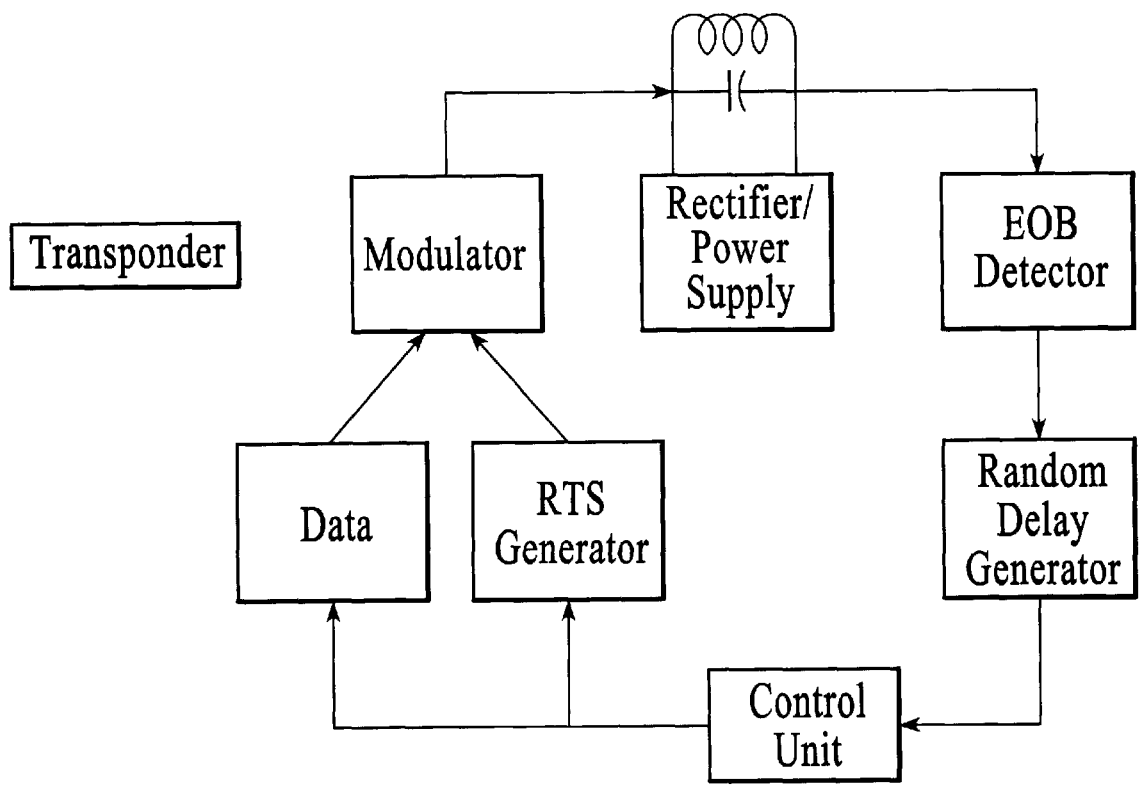

FIGS. 4 and 5 describe possible state diagrams of the reader and transponders to realize the described protocol. FIG. 6 shows the block diagram of the hardware of the reader and the transponder required for the multi-tag protocol.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. The method of reading a plurality of transponders comprising:
   (a) pulsing of an interrogation field which is sent by a reader generating End Of Burst Signals as a time base;
   (b) generating a Request To Send signal consisting of a defined pattern and a random value with a delay after the End Of Burst signals by each of the plurality of transponders;
   (c) providing a second End Of Burst signal by the reader after receiving a valid Request To Send signal from one of the plurality of transponders;
   (d) transmitting the main data by one of the plurality of transponders; and
   (e) detecting collisions at the reader when the Request To Send signals of at least two of the plurality of transponders are sent substantially simultaneously, whereby a valid defined pattern and random value cannot be read by the reader.

2. The method of claim 1 wherein the one transponder enters sleep mode after the data transmission is acknowledged by another End Of Burst Signal from the reader.

3. The method of claim 2 repeating steps (c) and (d) for the remaining transponders of the plurality of transponders.

4. The method of claim 1 further comprising continuing to pulse the interrogation field by the reader following detection of a collision at the reader.

5. The method of claim 1 wherein the interrogation field is pulsed periodically.

6. A system of reading a plurality of transponders comprising:
   means for pulsing of an interrogation field which is sent by a reader generating End of Burst Signals as a time base;
   means for generating a Request To Send signal consisting of a defined pattern and a random value with a delay after the End of Burst signals by each of the plurality of transponders;
   means for providing a second End of Burst signal by the reader after receiving a valid Request To Send signal from one of the plurality of transponders; means for transmitting the main data by one of the transponders; and
   means for detecting collisions at the reader when the Request To Send signals of at least two of the plurality of transponders are sent substantially simultaneously, whereby a valid defined pattern and random value cannot be read by the reader.

7. The system of claim 6 wherein the one transponder enters sleep mode after the data transmission is acknowledged by another End of Burst Signal from the reader.

8. The system of claim 6 wherein the means for pulsing an interrogation field which is sent by a reader continues to pulse the interrogation field after detection of a collision at the reader.

9. The system of claim 6 wherein the interrogation field is pulsed periodically.

* * * * *